(12) United States Patent  
Sarin (10) Patent No.: US 7,698,642 B1
(45) Date of Patent: Apr. 13, 2010

(54) METHOD AND APPARATUS FOR GENERATING PROMPTS

(75) Inventor: Philip D. Sarin, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1348 days.

(21) Appl. No.: 10/236,643

(22) Filed: Sep. 6, 2002

(51) Int. Cl.
*G06F 3/00* (2006.01)
*H04M 1/64* (2006.01)

(52) U.S. Cl. .................. 715/703; 715/728; 715/762; 379/67.1; 379/88.13; 379/88.17; 709/206; 709/220

(58) Field of Classification Search .......... 715/703, 715/716, 727, 728, 744, 746, 762, 853, 854; 379/67.1, 88.04, 88.11, 88.13, 88.17, 88.18; 709/206, 220
See application file for complete search history.

(56) References Cited

U.S. PATENT DOCUMENTS

| 5,499,335 | A | * | 3/1996 | Silver et al. | 715/703 |
| 5,524,137 | A | * | 6/1996 | Rhee | 379/88.01 |
| 5,978,738 | A | * | 11/1999 | Brown | 702/3 |

(Continued)

OTHER PUBLICATIONS

Richard Costello, "Nortel Networks Meridian Mail," Sep. 5, 2001, Product Report, DPRO-89919, http://www.gl.iit.edu/gartner2/research/89900/89919/89919.html, printed Sep. 17, 2003, pp. 1-8.

(Continued)

*Primary Examiner*—Tadeese Hailu
(74) *Attorney, Agent, or Firm*—Hickman Palermo Truong & Becker LLP (57) ABSTRACT

Techniques are provided for generating a prompt in a particular language. Multiple prompt components are selected and arranged based on the language in which the prompt is generated.

55 Claims, 8 Drawing Sheets

U.S. PATENT DOCUMENTS

| | | | | |
|---|---|---|---|---|
| 6,069,939 | A * | 5/2000 | Fung et al. | 379/67.1 |
| 6,366,578 | B1 * | 4/2002 | Johnson | 370/353 |
| 6,370,238 | B1 * | 4/2002 | Sansone et al. | 379/88.23 |
| 6,519,597 | B1 | 2/2003 | Cheng et al. | |
| 6,597,990 | B2 * | 7/2003 | Brown | 702/3 |
| 6,766,298 | B1 * | 7/2004 | Dodrill et al. | 704/270.1 |
| 6,792,085 | B1 * | 9/2004 | Rigaldies et al. | 379/88.13 |
| 6,857,008 | B1 * | 2/2005 | Shenefiel | 709/219 |
| 6,912,539 | B1 * | 6/2005 | Kapitanski et al. | 707/101 |
| 6,950,792 | B1 * | 9/2005 | Nussbaum | 704/8 |
| 7,031,956 | B1 | 4/2006 | Lee et al. | |
| 7,039,165 | B1 * | 5/2006 | Saylor et al. | 379/88.18 |
| 7,051,114 | B1 * | 5/2006 | Ravishankar et al. | 709/245 |
| 7,260,187 | B1 * | 8/2007 | McAllister | 379/88.04 |
| 7,308,477 | B1 * | 12/2007 | Gress et al. | 709/206 |
| 7,502,993 | B1 * | 3/2009 | Dodrill et al. | 715/205 |
| 2002/0186257 | A1 * | 12/2002 | Cadiz et al. | 345/838 |
| 2003/0101169 | A1 | 5/2003 | Bhatt et al. | |
| 2003/0200080 | A1 * | 10/2003 | Galanes et al. | 704/200 |
| 2003/0212662 | A1 | 11/2003 | Shin et al. | |
| 2004/0128144 | A1 * | 7/2004 | Johnson et al. | 704/278 |
| 2004/0148278 | A1 | 7/2004 | Milo et al. | |
| 2004/0267760 | A1 | 12/2004 | Brundage et al. | |
| 2005/0055355 | A1 | 3/2005 | Murthy et al. | |
| 2005/0091057 | A1 * | 4/2005 | Phillips et al. | 704/270.1 |
| 2005/0120029 | A1 | 6/2005 | Tomic et al. | |
| 2005/0228792 | A1 | 10/2005 | Chandrasekaran et al. | |
| 2005/0240624 | A1 | 10/2005 | Ge et al. | |
| 2005/0289125 | A1 | 12/2005 | Liu et al. | |

OTHER PUBLICATIONS

Avaya Inc., "Unified Messenger®, Key Features," 2003, http://www.avaya.es/Productos_y_Servicios/Mensajeria/Unified_Messaging/Unified_Messenger_for_Microsoft_Exchange/Key_Features/default.asp?print=yes, printed Sep. 17, 2003, pp. 1-2.

Avaya, Inc., "Octel 250/350 Message Servers, The Scaleable Communication Solution for the new Customer Economy," 2001, http://www1.avaya.com/enterprise/brochures/mpl1012.pdf, 4 pages.

Samsung Telecommunications America, Inc., "Samsung Cadence Voicemail System," 1999-2002, http://www.mainstreetconnections.com/cadence.htm, printed Sep. 17, 2003, pp. 1-7.

* cited by examiner

METHOD AND APPARATUS FOR GENERATING PROMPTS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The systems and methods described herein relate to generating one or more prompts, such as voicemail prompts.

BACKGROUND

Various systems are available that generate prompts (such as voicemail prompts, email prompts, etc.) for users of the systems. These prompts may provide information about a particular system or feature. Alternatively, these prompts may provide a list of options or functions available to the user. Multiple prompts may be arranged in a hierarchy such that prompts provided to a particular user may change as that user navigates through the prompt hierarchy. Example prompts include, "You have three new voicemail messages", "You have two new email messages", "Press 1 to save this message or press 2 to delete this message" and "Your message has been sent". The prompts used in a particular system may vary depending on the characteristics of the particular system.

Certain prompts may include multiple parts. For example, a prompt generated in a unified messaging system may include the following parts: "You have", "two", "new voicemail messages", "three", "new email messages", "and", "no", and "new fax messages". These multiple parts are concatenated together to form a single prompt that is communicated to the user. The prompt may be displayed to the user in printed form, audibly played for the user to hear, or provided to the user in another manner.

When the prompts are being provided in a single language, such as English, handling prompts with one or more parts is relatively simple. However, when a particular system is required to generate and process prompts in multiple languages and/or multiple dialects, the handling of prompts with multiple parts becomes more complicated. For example, concatenating several prompt parts (or prompt components) in a particular order may not be appropriate for all languages. The particular order of prompt parts may need to change depending on the language for which the prompt is being generated. Many systems use a variety of prompts and prompt components that can be arranged in various manners. Attempting to create and store a separate prompt for every possible combination of prompt components in every language and every dialect is not practical.

Accordingly, there is a need for systems and methods that allow prompts to be generated in a variety of different languages using one or more prompt components.

SUMMARY

The systems and methods described herein support the generation of prompts in multiple languages and/or dialects. Support for additional languages and/or dialects can be added without restarting the system or compiling a new set of code to be executed by the system. A particular implementation includes a core module that determines when a prompt is to be generated and a prompts module that generates an appropriate prompt in response to a request from the core module. In this implementation, the prompts module is capable of accessing localization information for each language supported by the system. The localization information specifies an appropriate sequence of sound files or other data necessary to generate the requested prompt.

In one embodiment, a request to generate a prompt is received. The request identifies a language in which the prompt is to be generated. Multiple prompt components associated with the requested prompt are selected. The multiple prompt components are also associated with the language in which the prompt is to be generated. The multiple prompt components are arranged to generate the requested prompt.

BRIEF DESCRIPTION OF THE DRAWINGS

The systems and methods described herein are illustrated by way of example, and not by way of limitation, in the figures of the accompanying drawings. Similar reference numbers are used throughout the drawings to reference similar elements and features.

DETAILED DESCRIPTION

The systems and methods described herein generate various prompts, such as voicemail prompts or email prompts, in a language appropriate for the recipient of the prompt. For purposes of explanation, numerous specific details are set forth in order to provide a thorough understanding of the various systems and methods. It will be apparent, however, that the systems and methods described herein may be implemented without these specific details. The specification and drawings are, accordingly, to be regarded in an illustrative rather than a restrictive sense.

Particular examples are described herein with reference to a unified messaging system. However, the systems and methods described herein may be applied to any type of system and any type of prompt or other message. Particular embodiments may be used with voicemail systems, email systems, interactive voice response systems, and the like. As used herein, the term "prompt" shall mean any type of instruction, request, notice, or other type of message. A prompt may be displayed to a user (e.g., in a textual format), played to a user (e.g., playing one or more audio files through a telephone speaker or a computer speaker), or otherwise provided to a user.

System Overview

Figure 1:
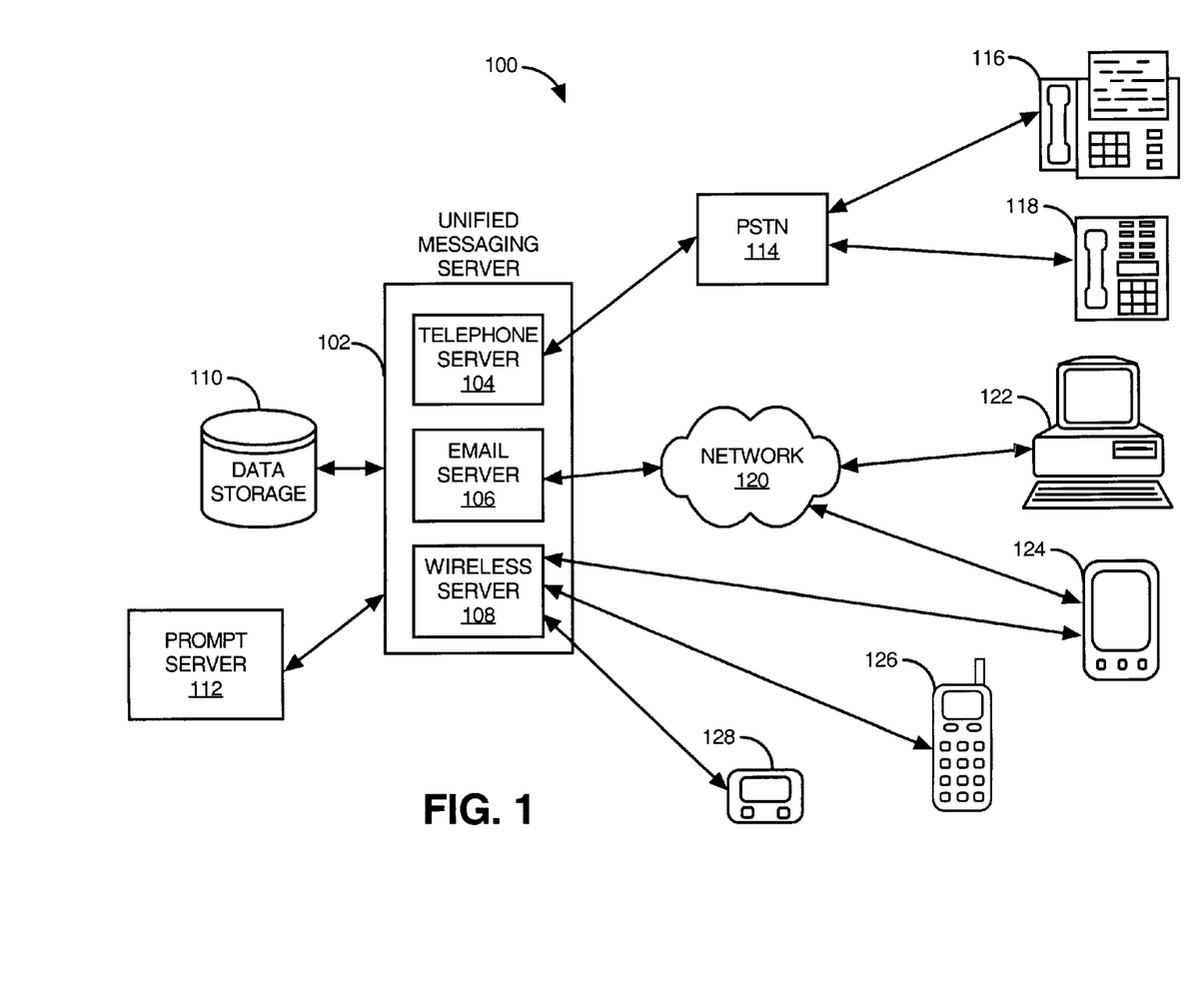
FIG. 1 illustrates an example environment in which the systems and methods discussed herein may be implemented.

FIG. 1 illustrates an example environment 100 in which the systems and methods discussed herein may be implemented. Environment 100 includes a unified messaging server 102, which represents a logical collection of servers including a telephone server 104, an email server 106 and a wireless server 108. The unified messaging server 102 allows voice-mail messages, email messages and fax messages to be stored in and retrieved from a common system. Telephone server 104 handles various telephone and voice-mail related functions, such as communicating with a telephone 118 or a fax machine 116 via a public switched telephone network (PSTN) 114. Email server 106 handles incoming and outgoing email messages and other email-related functions. In the example of FIG. 1, email server 106 communicates with computer 122 and a personal digital assistant (PDA) 124 via a network 120, such as a local area network (LAN) and/or the Internet. Wireless server 108 communicates with one or more wireless devices, such as PDA 124, a cellular phone 126 and a pager 128 using various wireless communication protocols and systems. In this example, PDA 124 is a wireless PDA that is capable of communicating via a wireless communication link with wireless server 108 and is capable of communicating with email server 106 via a wired network 120. Alternatively, PDA 124 may communicate with email server 106 via a combination of wired and wireless communication links.

Unified messaging server 102 is coupled to a data storage device 110 and a prompt server 112. Data storage device 110 stores various information used by unified messaging server 102, such as voicemail data, email data, and various configuration information. Prompt server 112 generates various prompts for use by telephone server 104, email server 106 and/or wireless server 108. Additional details regarding the operation of prompt server 112 are provided below.

Although FIG. 1 illustrates one telephone 118, one fax machine 116, one computer 122, one PDA 124, one cellular phone 126 and one pager 128, a particular environment 100 may include any number of these devices coupled to unified messaging server 102 via any number of communication links and any number of networks. Unified messaging server 102 may also communicate with other types of devices not shown in FIG. 1. Additionally, unified messaging server 102 may be coupled to any number of data storage devices 110 and any number of prompt servers 112.

Figure 2:
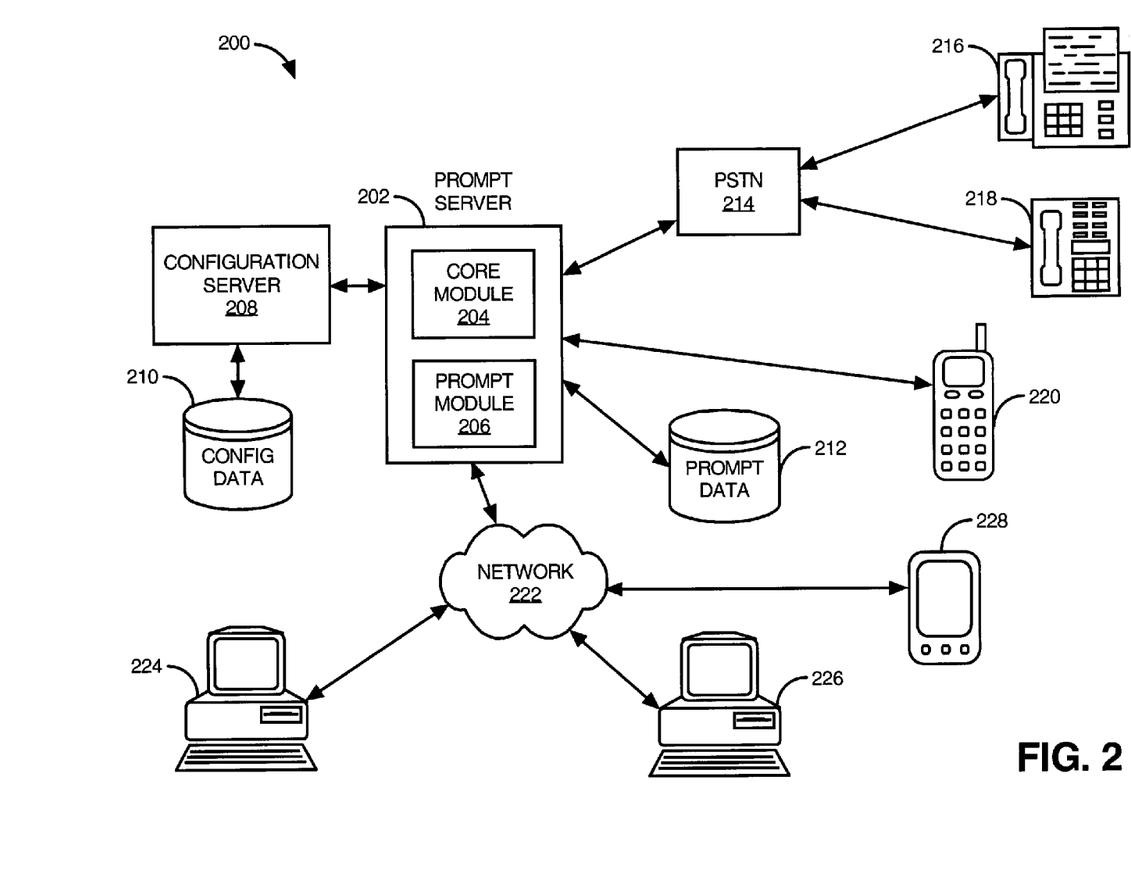
FIG. 2 illustrates another example environment including an exemplary prompt server, a configuration server and an audio data storage device accessed by the prompt server.

FIG. 2 illustrates another example environment 200 including an exemplary prompt server 202, a configuration server 208 and a prompt data store 212 that is accessed by the prompt server. Prompt server 202 is capable of generating audio prompts and text prompts, as well as other prompts, in a variety of different languages. Prompt server 202 includes a core module 204 and a prompt module 206. As discussed in greater detail below, the core module 204 and the prompt module 206 work together to generate a prompt containing the proper information in an appropriate language. Core module 204 determines the type of prompt to be generated as well as any parameters necessary to generate the prompt. Core module 204 then communicates this information to prompt module 206, which generates an appropriate sequence of audio files, text files, or other data that represent the prompt. Prompt module 206 relies on an extensible markup language (XML) localization document (discussed below) for each language supported by the system.

Prompt server 202 is coupled to a configuration server 208, which handles various setup and configuration functions associated with the prompt server. A configuration data store 210 coupled to configuration server 208 stores various configuration information and other data used by configuration server 208.

Prompt data store 212 is coupled to prompt server 202 and contains, for example, audio files, text files, and other data used by the prompt server to generate prompts. Prompt server 202 is also coupled to PSTN 214, which allows the prompt server to communicate with a telephone 218, a fax machine 216, and similar devices. Prompt server 202 is capable of communicating with wireless devices, such as a cellular phone 220, and capable of communicating with other computing devices via a network 222. These other computing devices include desktop computers 224 and 226, and PDA 228. Network 222 may be a LAN, the Internet, or a combination of two or more networks.

Although FIG. 2 illustrates one telephone 218, one fax machine 216, two computers 224 and 226, one PDA 228 and one cellular phone 220, a particular environment 200 may include any number of these devices coupled to prompt server 202 via any number of communication links and any number of networks. Prompt server 202 may also communicate with other types of devices not shown in FIG. 2.

Although prompt server 202 and configuration server 208 are illustrated in FIG. 2 as separate components, alternate embodiments may combine these two components (as well as other components) into a single device or component. Similarly, configuration data store 210 and prompt data store 212 may be combined in a single storage device that is coupled to or incorporated into prompt server 202 or another component.

Functional Overview

As discussed in greater detail below, the system operates by receiving a request to generate a prompt, for example, in a particular language. If the language has not already been "initialized" by the system, the particular language is initialized by executing an appropriate XML localization script that contains the information necessary to generate prompts in the particular language. Once the appropriate language has been initialized, a prompt is generated. The prompt is represented, for example, by a sequence of audio files or other data.

Generating Prompts

Figure 3:
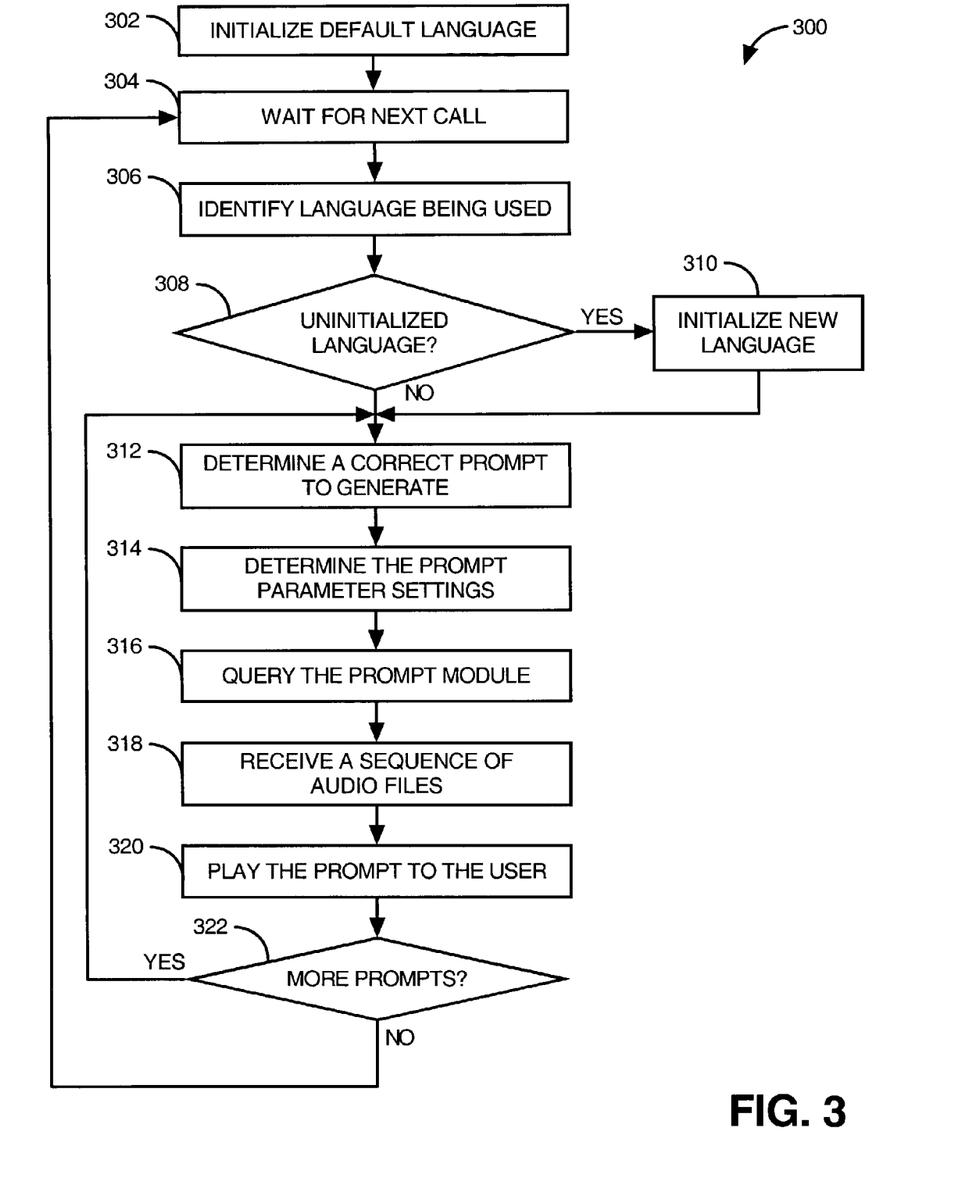
FIG. 3 illustrates a flow diagram of a procedure for generating a prompt in a particular language.

FIG. 3 illustrates a flow diagram of a procedure 300 for generating a prompt in a particular language. In one embodiment, procedure 300 is implemented by prompt server 202 shown in FIG. 2. The example of FIG. 3 describes the generation of audio prompts in a telephone-based system, such as a voicemail system or a unified messaging system. However, similar procedures can be used to generate any type of prompt in any system.

The procedure begins by initializing a default language (act 302). This default language may be determined based on the location of the system that generates prompts. For example, if the prompt generating system is located in the United States, the default language is typically set to English. The default language identifies the language used to generate prompt messages. The procedure then awaits the next call or other request to generate a prompt (act 304). Calls may be received, for example, from an individual desiring to receive information in the form of an audio prompt.

When a call is received, the procedure identifies the language being used by the call (act 306). The language is identified based on the calling user's preferred language or the default language if the calling user is unknown or has not selected a preferred language. The procedure then determines whether the language associated with the received call has already been initialized (act 308). If the language associated with the received call has not already been initialized, the procedure branches to act 310 to initialize the new language. Languages are initialized by obtaining an XML localization document associated with the language and parsing the XML document to generate a document object model tree. Additional details regarding language initialization are provided below.

Next, the procedure determines a correct prompt to generate in response to the received call (act 312). The correct prompt may be, for example, an introductory message welcoming the caller to a voicemail system, a list of options available to the caller (such as check new voicemail messages, send a voicemail message, or modify voicemail settings), or an indication of the number of voicemail messages stored for a particular user. The correct prompt may be determined based on the identity of the caller, input received from the caller, the identity of the recipient, the recipient's preferences, or other information.

The procedure then determines the appropriate prompt parameter settings needed to generate the desired prompt (act 314). For example, a particular parameter may indicate the number of new voicemail messages the user has received. This number is then inserted into the prompt (e.g., "You have" "three" "new voicemail messages"). The parameter settings may be contained in an XML script, as discussed below. In a particular embodiment, the actions described with reference to acts 312 and 314 are performed by core module 204 of prompt server 202 (FIG. 2).

The procedure then communicates information to the prompt module (e.g., prompt module 206) regarding the prompt to be generated and the prompt parameter settings (act 316). The prompt module then generates an appropriate sequence of audio files that represent the requested prompt. The core module (e.g., core module 204) receives this sequence of audio files from the prompt module (act 318). The prompt (i.e., the sequence of audio files) is then played to the user (act 320). The procedure then determines whether there are more prompts to be generated for the particular call (act 322). If so, the procedure returns to act 312 to identify the next prompt to be generated. If no additional prompts are to be generated for the particular call, the procedure returns to act 304 to await the next call.

Exemplary Data Structure

Figure 4:
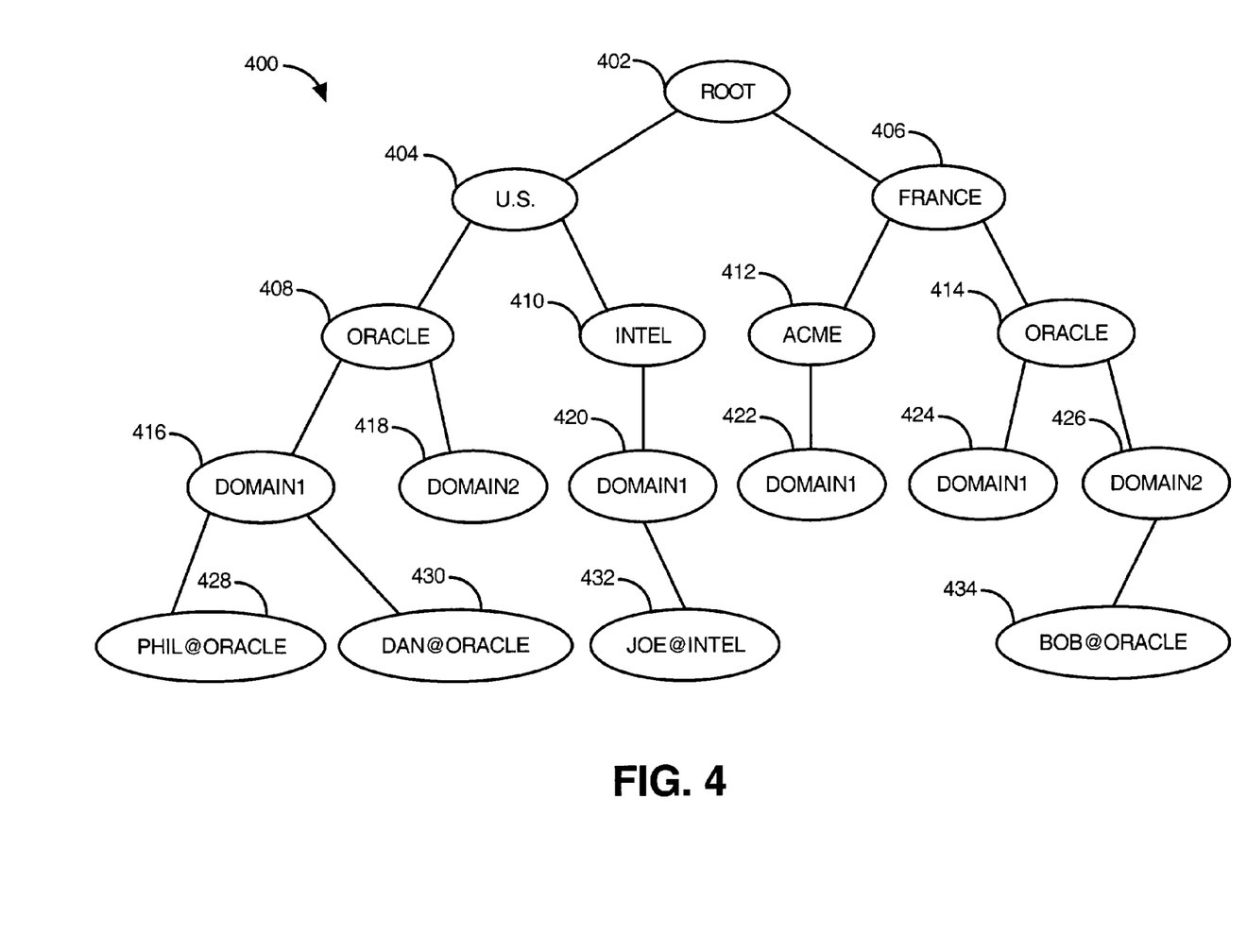
FIG. 4 is a diagram of an example data structure utilized by the systems and methods described herein.

FIG. 4 is a diagram of an example data structure 400 utilized by the systems and methods described herein. Data structure 400 includes a hierarchy of individual entries. Each entry (represented by an oval) in data structure 400 identifies a directory. A root directory 402 includes two subdirectories 404 and 406. The level of the hierarchy that includes subdirectories 404 and 406 is referred to as a country layer. The next level of the hierarchy is referred to as a company layer and includes subdirectories 408, 410, 412 and 414. In this example, the "U.S." directory has two subdirectories (408 and 410) and the "France" directory has two subdirectories (412 and 414). The next level of the hierarchy is referred to as a domain layer that includes domain directories 416, 418, 420, 422, 424 and 426. In this example, some directories in the company layer have two associated domain directories, while other directories in the company layer have a single associated domain directory.

Domain directories 416, 420 and 426 have one or more associated user nodes. Specifically, domain directory 416 has two associated user nodes 428 and 430, domain directory 420 has one associated user node 432, and domain directory 426 has one associated user node 434. Although not shown in FIG. 4, one or more domain directories 416-426 may also include one or more shared resource nodes and/or document nodes associated with the domain directory.

According to one embodiment, each node in the data structure 400 may be associated with one or more attributes. For example, attributes associated with each domain directory 416-426 and associated with each user node 428-434 may be used to identify a language used within a particular country, within a particular company, within a particular domain, and/or by a particular user. If no language preference is explicitly specified at any particular node of the data structure, the language associated with the parent node of that node becomes the language preference for prompts associated with that node.

FIG. 4 represents one possible data structure. Alternate data structures may contain any number of hierarchy levels and any number of subdirectories at each level. Further, a particular directory may have any number of subdirectories, any number of sub-subdirectories, and so forth. Similarly, a particular domain directory may include any number of associated user nodes, shared resource nodes and/or document nodes.

Language Initialization

For each language that is initialized, the prompt module generates a document object model (DOM) tree. The DOM tree typically contains three levels: a first level identifying a particular language or dialect, a second level (below the first level) identifying one or more prompts that are supported by the particular language or dialect, and a third level (below the second level) identifying one or more sound files, prompt cross-references, or rules that are associated with each prompt on the second level. Each DOM tree is generated by extracting data from an XML localization script (also referred to as an XML localization document). Each DOM tree is stored in a localized message table that is cached, for example, in the prompt module. When the core module requests a prompt, the prompt module locates that prompt's DOM tree and analyzes the DOM tree to determine the appropriate prompt files.

Selecting a Localization Scheme

A localization scheme defines, for example, how to generate prompts for a particular language, a particular location, a particular dialect, or other characteristic. A specific localization scheme may specify an appropriate sequence of sound files and/or other data necessary to generate the requested prompt. When selecting an appropriate localization scheme, data structure 400 is traversed starting at the bottom and continuing upwards until a localization scheme is identified.

In a particular embodiment, the prompt server contains a default localization scheme, a localization scheme for each supported language, and a localization scheme for each version of the language (also referred to as a dialect). For example, a default localization scheme may use U.S. English as the default language. Different versions of a language include, for example, U.S. English and British English. If a localization scheme for the preferred language of a user does not exist, the system uses the default localization scheme of the preferred language associated with a parent, in data structure 400 (FIG. 4), of the node associated with that user. Thus, when identifying a localization scheme to use in generating a particular prompt, the data structure 400 is traversed from the bottom upwards until a localization scheme for the preferred language is located.

Exemplary Localization Script

Figure 5:
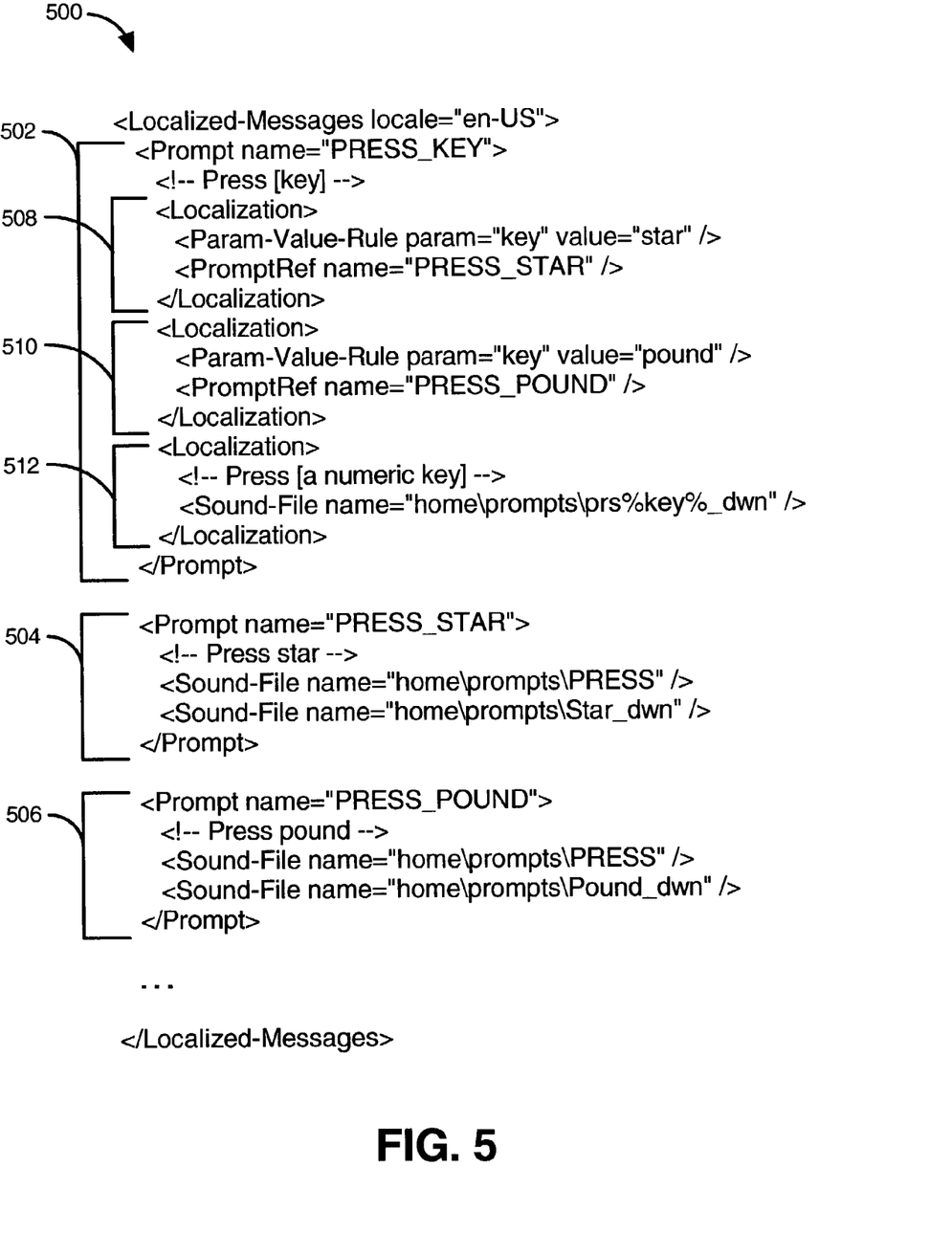
FIG. 5 illustrates a portion of an XML localization script utilized by the systems and methods discussed herein.

FIG. 5 illustrates a portion of an XML localization script 500 utilized by the systems and methods discussed herein. XML localization script 500 defines the manner in which prompts are generated for a particular language, location, or dialect. For each localization script, various parameter settings can be specified. These parameter settings have specific localization behaviors that are defined, for example, by a set of rules. These rules include "parameter value" rules, "parameter range" rules and "parameter in set" rules. A "parameter value" rule is satisfied if a particular parameter has a specific setting, such as checking to see if the parameter "key" is set to "star". If the parameter is set to an integer, that integer is first converted into a string and then compared to the setting specified in the rule. If the parameter is not set, then the rule is not satisfied.

The "parameter range" rule is satisfied if a particular integer parameter falls within a specified range of values. A minimum value must be specified, but a maximum value is optional. For example, the rule may check the value of a parameter "hour" to see that it falls within the range of integers 1 to 12. If the parameter is not set or if the parameter is set to a string value, the rule is not satisfied. The "parameter in set" rule is satisfied if a particular integer parameter takes one value out of a finite set of values. For example, the rule may check to see whether the value of a parameter "dayofmonth" is in the set {1, 21, 31}. If the parameter is not set or if the parameter is set to a string value, the rule is not satisfied.

Each prompt definition may include zero or more of the above rules. Rules are grouped together in blocks. The localization behavior that is utilized is associated with the first block for which all the rules in the block are satisfied.

Referring again to FIG. 5, the first line of XML localization script 500 identifies the name of the script (Localized-Messages) and a locale (or language) that this particular script supports. In this example, the locale is "en-US" which identifies the language as the U.S. version of the English language. Other XML localization scripts are provided for each additional language or dialect supported by the system. Thus, additional languages or dialects can be supported by creating or modifying localization scripts. The new or modified localization scripts can be executed without restarting the system or recompiling instructions that are executed by the system.

XML localization script 500 includes multiple prompt descriptions 502, 504 and 506. Each prompt description defines the manner in which the associated prompt is generated. The prompt description may include one or more parameters and/or rules that are used in generating an appropriate prompt. Prompt description 502 is associated with a "PRESS_KEY" prompt, prompt description 504 is associated with a "PRESS_STAR" prompt and prompt description 506 is associated with a "PRESS_POUND" prompt. Although only three prompt descriptions are shown in FIG. 5, a particular XML localization script may include any number of prompt descriptions. Further, the localization script may be implemented using any language.

Each prompt description 502-506 includes one or more localization blocks. In the example of FIG. 5, prompt descriptions 504 and 506, which specify no localization blocks explicitly, are each considered to have one localization block with no rules. In the example of FIG. 5, prompt description 502 includes three localization blocks 508, 510 and 512, each containing a different rule and associated response if the rule is satisfied. Localization block 508 defines how to generate a prompt to press the star (*) key on a keypad. If the parameter "key" equals "star", then the rule is satisfied and the prompt named "PRESS_STAR" (prompt description 504) is generated. For example, the "PRESS_STAR" prompt may be "press the star key". Localization block 510 defines how to generate a prompt to press the pound key on a keypad. If the parameter "key" equals "pound", the rule is satisfied and the prompt named "PRESS_POUND" (prompt description 506) is generated. For example, the "PRESS_POUND" prompt may be "press the pound key". Localization block 512 defines how to generate a prompt to press one of the numeric keys on a keypad. In this block, the value of the parameter "key" (i.e., the numeric key to press) replaces the "% key %" portion of the sound file name to select the appropriate sound file to play. In localization block 512, there is no rule, so any value of the key parameter is accepted and inserted into the sound file name.

Script 500 can be used in a variety of situations. For example, in a voicemail system, script 500 is used to generate prompts instructing the user how to retrieve voicemail messages, delete voicemail messages, modify the voicemail settings, etc. An example prompt, "To listen to your new voicemail messages, press the pound key" uses script 500 to generate the "press the pound key" portion of the prompt by setting the "key" parameter equal to "pound" and executing script 500.

As discussed herein, different languages or dialects can be supported by providing a localization document associated with the desired language or dialect. Additionally, different localization documents may be used in different domains. For example, one set of localization documents may be provided for a particular domain and a second set of localization documents are provided for a different domain. Alternatively, a common set of localization documents may support an entire system or an entire domain.

Figure 6:
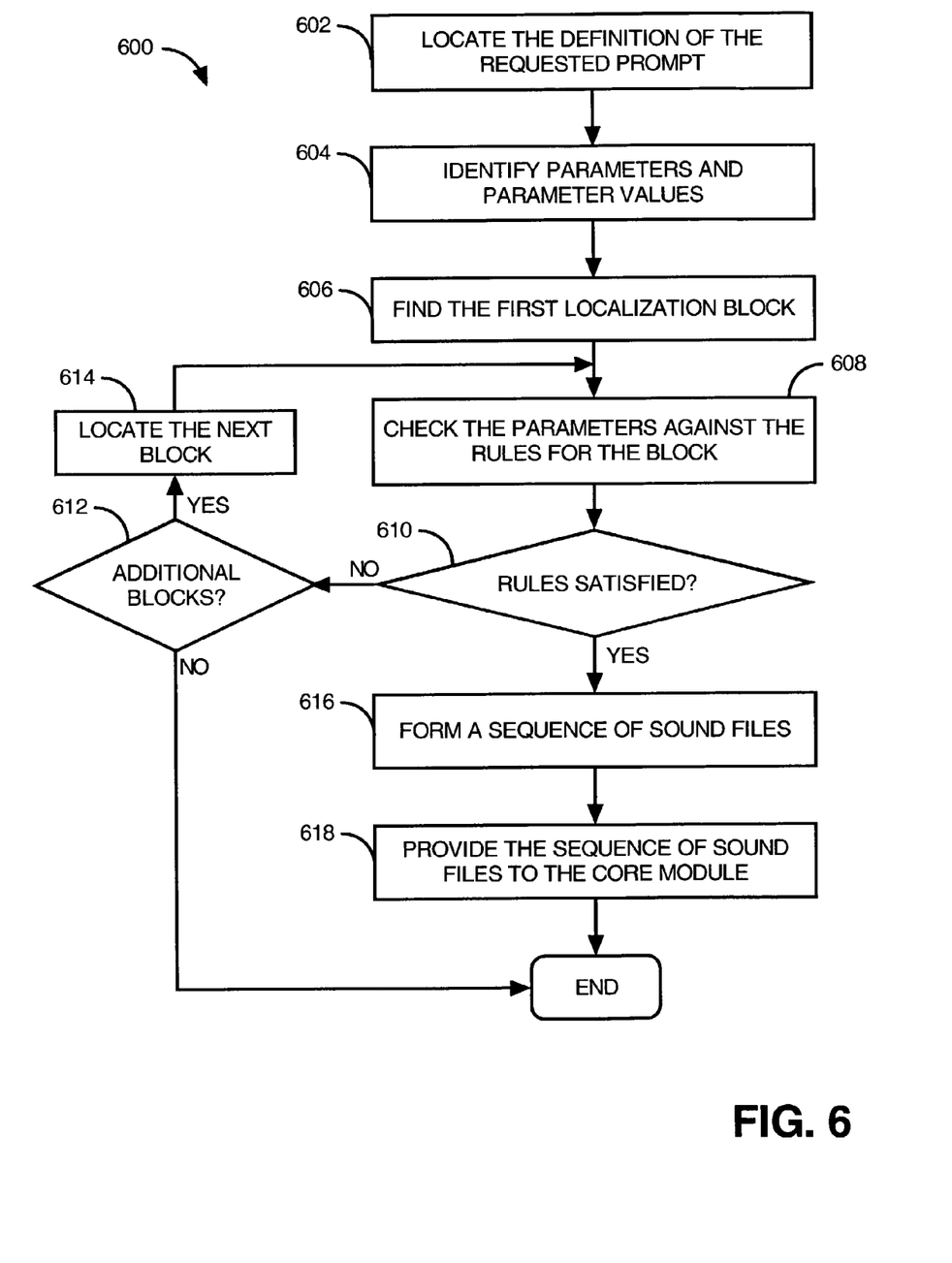
FIG. 6 illustrates a flow diagram of a procedure for generating a sequence of sound files.

FIG. 6 illustrates a flow diagram of a procedure 600 for generating a sequence of sound files that are used to generate a prompt. Initially, the procedure 600 locates the definition of the requested prompt (act 602). The definition of the requested prompt may be located in, for example, an XML localization script such as script 500 discussed above. The procedure then identifies parameters and parameter values that are used by the requested prompt (act 604). Some prompts may not contain any parameters or parameter values. The procedure then finds the first localization block (act 606). As discussed above, a particular prompt may include any number of localization blocks.

The procedure 600 continues by checking one or more parameters associated with the requested prompt against the rules contained in the first localization block (act 608). Act 610 determines whether the rules of the localization block are satisfied by the parameter values. If not, the procedure 600 branches to act 612, which determines whether the requested prompt contains additional localization blocks to evaluate. If there are no additional localization blocks in the requested prompt, the procedure 600 is complete. If act 612 determines that there are additional localization blocks to evaluate, the procedure locates the next block to evaluate (act 614). The parameters are then checked against the rules associated with the next block (act 608).

If the rules of a localization block are satisfied by the parameter values, the procedure continues from act 610 to act 616, which forms a sequence of sound files based on information contained in the localization block. This sequence of sound files is then provided to the core module for handling (act 618).

Figure 7:
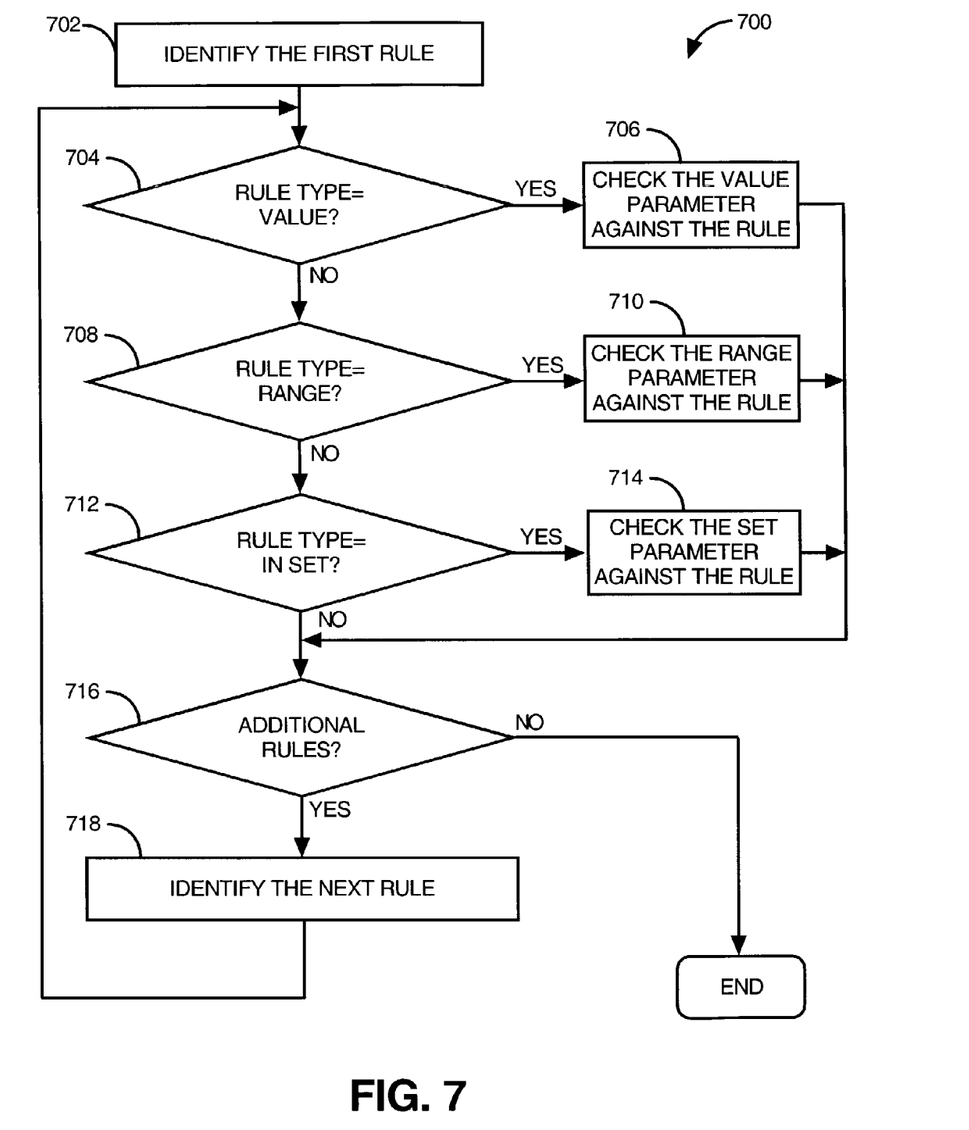
FIG. 7 illustrates a flow diagram of a procedure for evaluating one or more rules in a localization block.

FIG. 7 illustrates a flow diagram of a procedure 700 for evaluating one or more rules in a localization block. Procedure 700 begins by identifying a first rule in a localization block (act 702). The first rule is evaluated to determine whether the first rule type is "value" (act 704). If so, the procedure checks the value parameter against the rule (act 706). If the first rule type is not "value", the procedure determines whether the first rule type is "range" (act 708). If so, the procedure checks the range parameter against the rule (act 710). If the first rule type is not "range", the procedure determines whether the first rule type is "in set" (act 712). If the first rule type is "in set", the procedure checks the set parameter against the rule (act 714).

The procedure 700 then determines whether additional rules remain to be evaluated (act 716). If any rule in a localization block is not satisfied, it is not necessary to evaluate the other rules in the block. If one or more additional rules need to be evaluated, the procedure identifies the next rule (act 718) and returns to determine the next rule type (act 704). If no additional rules need to be evaluated, the procedure is complete for this particular localization block. The procedure of FIG. 7 may be repeated for multiple localization blocks.

Hardware Overview

Figure 8:
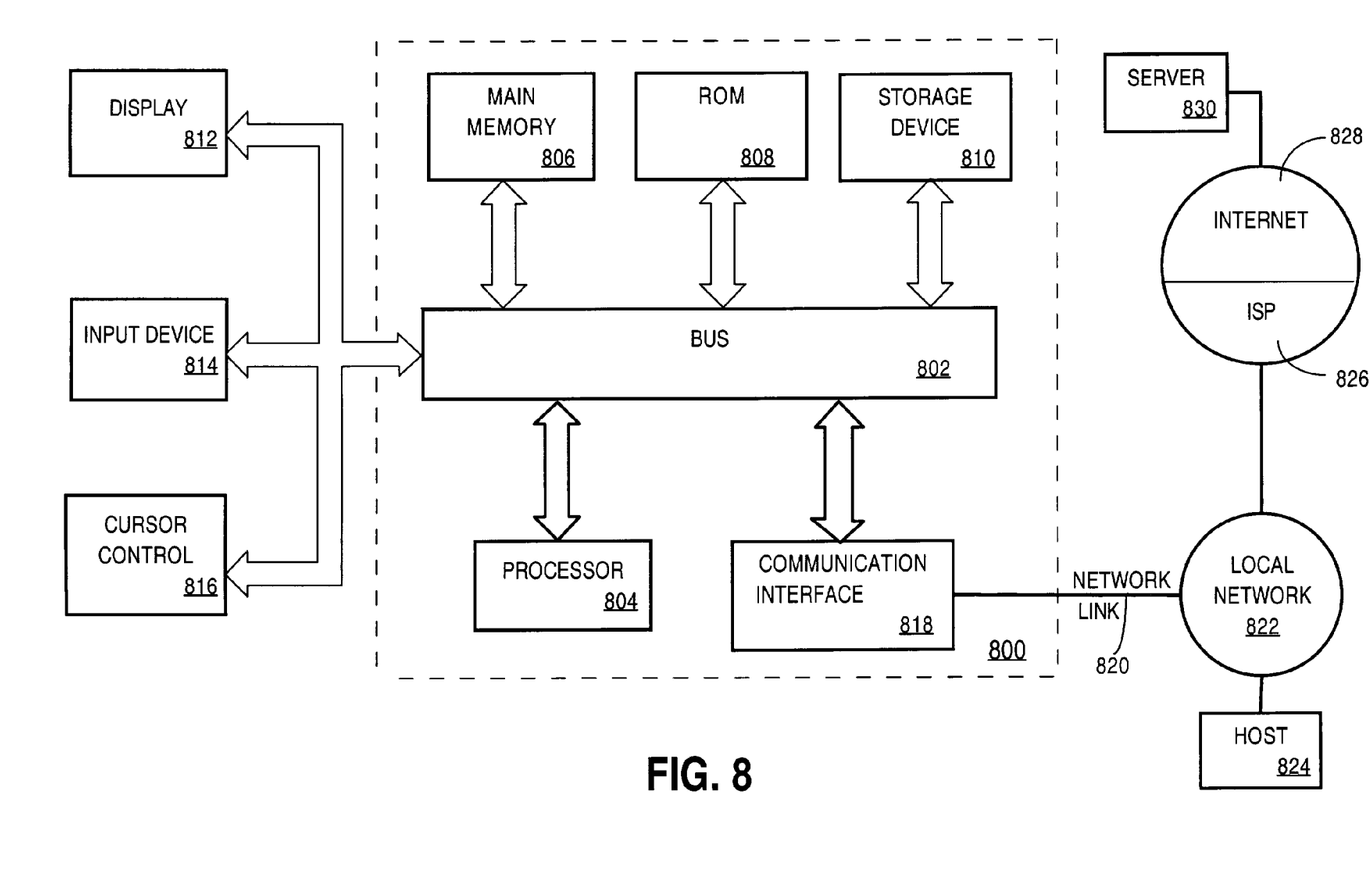
FIG. 8 is a block diagram that illustrates a computer system upon which the procedures discussed herein may be implemented.

FIG. 8 is a block diagram that illustrates a computer system 800 upon which the procedures discussed herein may be implemented. Computer system 800 includes a bus 802 or other communication mechanism for communicating information, and a processor 804 coupled with bus 802 for processing information. Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Computer system 800 further includes a read only memory (ROM) 808 or other static storage device coupled to bus 802 for storing static information and instructions for processor 804. A storage device 810, such as a magnetic disk or optical disk, is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

The described systems and methods are related to the use of computer system 800 for implementing various techniques described herein. According to one embodiment, those techniques are performed by computer system 800 in response to processor 804 executing one or more sequences of one or more instructions contained in main memory 806. Such instructions may be read into main memory 806 from another computer-readable medium, such as storage device 810. Execution of the sequences of instructions contained in main memory 806 causes processor 804 to perform the process steps described herein. In alternative embodiments, hard-wired circuitry may be used in place of or in combination with software instructions to implement the systems and methods described herein. Thus, the described systems and methods are not limited to any specific combination of hardware circuitry and software.

The term "computer-readable medium" as used herein refers to any medium that participates in providing instructions to processor 804 for execution. Such a medium may take many forms, including but not limited to, non-volatile media, volatile media, and transmission media. Non-volatile media includes, for example, optical or magnetic disks, such as storage device 810. Volatile media includes dynamic memory, such as main memory 806. Transmission media includes coaxial cables, copper wire and fiber optics, including the wires that comprise bus 802. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to processor 804 for execution. For example, the instructions may initially be carried on a magnetic disk of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are exemplary forms of carrier waves transporting the information.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution. In this manner, computer system 800 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
   receiving a request from a user, at a unified messaging server, for information,
   wherein the unified messaging server generates text prompts and audio prompts,
   wherein the unified messaging server is in communication with at least an email server and a voice mail server;
   obtaining a localization document, appropriate for the user, wherein the localization document contains rules that define a manner in which prompts are generated for a language;
   wherein the rules define which prompt file should be retrieved to generate a prompt for the user when at least one parameter representing user data input, received by the unified messaging system from the user, satisfies a particular rule;
   selecting, by applying the rules to the request received from the user, between text prompt files that apply to the email server and audio prompt files that apply to the voice mail server;
   selecting a plurality of prompt components from the determined files; and
   arranging the plurality of prompt components to generate the prompt to be provided to the user;
   in response to input from the user, the unified messaging server retrieving content from the email server or the voice mail server to be provided to the user.

2. The method of claim 1 wherein the request to generate a prompt further identifies a dialect associated with the language in which the prompt is to be generated and wherein the plurality of prompt components are further associated with the identified dialect.

3. The method of claim 1 further comprising playing the prompt to a source of the request to generate the prompt.

4. The method of claim 1 wherein the localization document comprises an Extensible Markup Language (XML) localization script.

5. The method of claim 1 wherein each of the plurality of prompt components comprises at least one of an audio file and a text file.

6. The method of claim 1 wherein selecting a plurality of prompt components is further based on at least one prompt parameter value.

7. The method of claim 1 wherein the plurality of prompt components includes at least one reference to another prompt containing at least one prompt component.

8. The method of claim 7 wherein the at least one prompt component is included with the plurality of prompt components to generate the prompt.

9. The method of claim 1 wherein the prompt comprises at least one of an audio message and a text message.

10. The method as recited in claim 1 wherein the localization document comprises multiple prompt descriptions.

11. The method of claim 1, wherein the request identifies the language in which the prompt is to be generated.

12. The method of claim 1, further comprising the steps of:
    parsing the localization document to generate a document object model (DOM) tree; and
    analyzing the DOM tree to determine files that are appropriate for the prompt.

13. A method comprising:
    receiving a request from a user, at a unified messaging server, for information,
    wherein the unified messaging server generates text prompts and audio prompts,
    wherein the unified messaging server is in communication with at least an email server and a voice mail server;
    selecting a plurality of prompt components associated with a prompt for the user, wherein the selected prompt components are further associated with a language in which the prompt is to be generated;
    wherein selecting a plurality of prompt components comprises:
        executing a localization script that is appropriate to the language and that comprises information for generating the prompt in the language;
        obtaining a localization document, appropriate for the user, associated with the language, wherein the localization document contains rules that define a manner in which prompts are generated for the language;
        wherein the rules define which prompt file should be retrieved to generate the prompt for the user when at least one parameter representing user data input satisfies a particular rule;
        selecting, by applying the rules to the request received from the user, between text prompt files that apply to the email server and audio prompt files that apply to the voice mail server; and
        arranging the plurality of prompt components, from the determined files, to generate the prompt to be provided to the user;
    in response to input from the user, the unified messaging server retrieving content from the email server or the voice mail server to be provided to the user.

14. The method of claim 13 wherein the localization document comprises an Extensible Markup Language (XML) document.

15. The method of claim 13, wherein the request identifies the language in which the prompt is to be generated.

16. The method of claim 13, further comprising the steps of:

parsing the localization document to generate a document object model (DOM) tree; and analyzing the DOM tree to determine files that are appropriate for the prompt.

17. A method comprising:

receiving a request from a user, at a unified messaging server, for information, wherein the unified messaging server generates text prompts and audio prompts, wherein the unified messaging server is in communication with at least an email server and a voice mail server;

identifying a language in which a prompt, for the user, is to be generated;

selecting a localization document, appropriate for the user, wherein the localization document contains rules that define a manner in which prompts are to be generated for the language;

wherein the rules define which prompt file should be retrieved to generate the prompt when at least one parameter representing user data input satisfies a particular rule;

selecting, by applying the rules to the request received from the user, between text prompt files that apply to the email server and audio prompt files that apply to the voice mail server;

selecting a plurality of prompt components, from the determined files, associated with the prompt and the language; and arranging the plurality of prompt components to generate the prompt to be provided to the user;

in response to input from the user, the unified messaging server retrieving content from the email server or the voice mail server to be provided to the user.

18. The method of claim 17 wherein the localization document comprises an Extensible Markup Language (XML) localization script.

19. The method of claim 17 wherein the request to generate a prompt further identifies a dialect associated with the language in which the prompt is to be generated and wherein the plurality of prompt components are further associated with the identified dialect.

20. The method of claim 17 wherein the prompt comprises at least one of a text file and an audio message.

21. The method as recited in claim 17 wherein the localization document comprises multiple prompt descriptions.

22. The method of claim 17, further comprising the steps of:

parsing the localization document to generate a document object model (DOM) tree; and analyzing the DOM tree to determine files that are appropriate for the prompt.

23. A method comprising:

receiving a request from a user, at a unified messaging server, for information, wherein the unified messaging server generates text prompts and audio prompts, wherein the unified messaging server is in communication with at least an email server and a voice mail server;

identifying a language in which a prompt for the user is to be generated;

initializing the language in which the prompt is to be generated;

wherein the initializing comprises:

executing a localization script that is appropriate to the language and that comprises information for generating a prompt in the language;

obtaining a localization document, appropriate for the user, associated with the language, wherein the localization document contains rules that define a manner in which prompts are generated for the language;

wherein the rules define which prompt file should be retrieved to generate the prompt when at least one parameter representing user data input satisfies a particular rule;

selecting, by applying the rules to the request received from the user, between text prompt files that apply to the email server and audio prompt files that apply to the voice mail server;

selecting a plurality of prompt components from the determined files associated with the prompt and the language; and arranging the plurality of prompt components to generate the prompt to be provided to the user;

in response to input from the user, the unified messaging server retrieving content from the email server or the voice mail server to be provided to the user.

24. The method as recited in claim 23 wherein the localization document comprises an Extensible Markup Language (XML) document.

25. The method of claim 23, further comprising the steps of:

parsing the localization document to generate a document object model (DOM) tree; and analyzing the DOM tree to determine files that are appropriate for the prompt.

26. A method of generating an audio prompt, the method comprising:

at a unified messaging server, determining a language to use when generating an audio prompt for a user, wherein the unified messaging server generates text prompts and audio prompts, wherein the unified messaging server is in communication with at least an email server and a voice mail server;

identifying prompt parameter settings associated with the audio prompt to be generated;

providing information regarding the audio prompt to be generated, the language to use when generating the audio prompt, and the audio prompt parameter settings to a prompt module; and receiving a sequence of audio files from the prompt module, wherein the sequence of audio files represent the audio prompt;

wherein a localization document, appropriate for the user, contains rules that define a manner in which prompts are generated for the language;

wherein the rules define which prompt file should be retrieved from the email server or the voice mail server in response to input from the user to generate the prompt when at least one parameter representing user data input satisfies a particular rule; and wherein the rules are applied to a request received from the user to select between text prompt files that apply to the email server and audio prompt files that apply to the voice mail server.

27. The method of claim 26 wherein the localization document comprises an Extensible Markup Language (XML) localization script.

28. The method as recited in claim 27 wherein the initializing the language comprises executing a localization script that is appropriate to the language and that comprises information for generating a prompt in the language.

29. The method as recited in claim 28 wherein the localization script comprises an Extensible Markup Language (XML) localization script.

30. The method of claim 26 further comprising playing the sequence of audio files representing the audio prompt to a source of a request to generate the audio prompt.

31. The method as recited in claim 26 wherein the localization document comprises multiple prompt descriptions.

32. The method of claim 26, wherein the identifying prompt parameter settings comprises (a) selecting the localization document based, at least in part, on the language determined for use, (b) parsing the localization document to generate a document object model (DOM) tree, and (c) analyzing the DOM tree to determine files that are appropriate for the prompt.

33. A computer-readable storage medium containing one or more sequences of machine-readable instructions that, when executed by one or more processors, cause the one or more processors to perform steps that comprise:
  receiving a request from a user, at a unified messaging server, for information,
  wherein the unified messaging server generates text prompts and audio prompts,
  wherein the unified messaging server is in communication with at least an email server and a voice mail server;
  obtaining a localization document, appropriate for the user, wherein the localization document contains rules that define a manner in which prompts are generated for a language;
  wherein the rules define which prompt file should be retrieved to generate a prompt for the user when at least one parameter representing user data input, received by the unified messaging system from the user, satisfies a particular rule;
  selecting, by applying the rules to the request received from the user, between text prompt files that apply to the email server and audio prompt files that apply to the voice mail server;
  selecting a plurality of prompt components from the determined files; and
  arranging the plurality of prompt components to generate the prompt to be provided to the user;
  in response to input from the user, the unified messaging server retrieving content from the email server or the voice mail server to be provided to the user.

34. The computer-readable medium of claim 33 wherein the localization document comprises an Extensible Markup Language (XML) localization script.

35. The computer-readable medium of claim 33 wherein the prompt components comprise at least one of audio files and text files.

36. The computer-readable storage medium as recited in claim 33 wherein the localization document comprises multiple prompt descriptions.

37. The computer-readable storage medium of claim 33, wherein the request identifies the language in which the prompt is to be generated.

38. The computer-readable storage medium of claim 33, wherein the one or more sequences of machine-readable instructions further cause the one or more processors to perform steps that comprise:
  parsing the localization document to generate a document object model (DOM) tree; and
  analyzing the DOM tree to determine files that are appropriate for the prompt.

39. A computer-readable storage medium containing one or more sequences of machine-readable instructions that, when executed by one or more processors, cause the one or more processors to:
  receive a request from a user, at a unified messaging server, for information,
  wherein the unified messaging server generates text prompts and audio prompts;
  wherein the unified messaging server is in communication with at least an email server and a voice mail server;
  initialize a language in which a prompt for the user is to be generated by steps that comprise:
  execute a localization script that is appropriate to the language and that comprises information for generating a prompt in the language;
  obtain a localization document, appropriate for the user, associated with the language, wherein the localization document contains rules that define a manner in which prompts are generated for the language;
  wherein the rules define which prompt file should be retrieved to generate the prompt when at least one parameter representing user data input satisfies a particular rule;
  select, by applying the rules to the request received from the user, between text prompt files that apply to the email server and audio prompt files that apply to the voice mail server;
  select a plurality of prompt components, from the determined files, associated with the prompt and the language; and
  arrange the plurality of prompt components to generate the prompt to be provided to the user;
  in response to input from the user, the unified messaging server retrieving content from the email server or the voice mail server to be provided to the user.

40. The computer readable medium as recited in claim 39 wherein the localization document comprises an Extensible Markup Language (XML) document.

41. The computer-readable storage medium of claim 39, wherein the request identifies the language in which the prompt is to be generated.

42. The computer-readable storage medium of claim 39, wherein the one or more sequences of machine-readable instructions further cause the one or more processors to:
  parse the localization document to generate a document object model (DOM) tree; and
  analyze the DOM tree to determine files that are appropriate for the prompt.

43. An apparatus comprising:
  a prompt server configured to receive requests from a user, at a unified messaging server, for information, and further configured to identify a language in which a prompt for the user is to be generated and to initialize the language,
  wherein the unified messaging server generates text prompts and audio prompts,
  wherein the unified messaging server is in communication with at least an email server and a voice mail server;
  a storage device configured to store a plurality of prompt components;
  wherein the prompt server selects at least one prompt component associated with the prompt for the user, wherein the at least one selected prompt component is further associated with the language in which the prompt is to be generated, and wherein the prompt server generates the prompt from the at least one selected prompt component;

wherein the localization document is based, at least in part, on the language identified and contains rules that define a manner with which prompts are generated for the language;

wherein the rules define which prompt file should be retrieved, from the email server or the voice mail server in response to input from the user, to generate the prompt when at least one parameter representing user data input satisfies a particular rule; and wherein the rules are applied to a request received from the user to select between text prompt files that apply to the email server and audio prompt files that apply to the voice mail server.

44. The apparatus of claim 43 wherein the prompt server comprises:

a core module configured to determine the type of prompt to be generated; and a prompt module configured to identify a plurality of prompt components used to generate the prompt.

45. The apparatus of claim 44 wherein the core module is further configured to identify at least one parameter used to generate the prompt.

46. The apparatus of claim 43 wherein the prompt server is coupled to at least one of a unified messaging system, a voicemail system and an email system.

47. The apparatus of claim 43 wherein the localization document comprises an Extensible Markup Language (XML) localization script.

48. The apparatus as recited in claim 43 wherein the localization document comprises multiple prompt descriptions.

49. The apparatus of claim 43, wherein initializing the language comprises (a) selecting the localization document (b) parsing the localization document to generate a document object model (DOM) tree, and (c) analyzing the DOM tree to determine files that are appropriate for the prompt.

50. An apparatus comprising:

a prompt server configured to receive requests from a user, at a unified messaging server, for information, and further configured to identify a language in which the prompt is to be generated and to initialize the language with execution of a localization script that is appropriate to the language and that comprises information for generating a prompt in the language, wherein the unified messaging server generates text prompts and audio prompts, wherein the unified messaging server is in communication with at least an email server and a voice mail server;

a storage device configured to store a plurality of prompt components; and wherein the prompt server selects at least one prompt component associated with the prompt, wherein the at least one selected prompt component is further associated with the language in which the prompt is to be generated, and wherein the prompt server generates the prompt from the at least one selected prompt component;

wherein the prompt server is further configured to initialize the language with functions that comprise:

obtaining a localization document, appropriate for the user, associated with the language, wherein the localization document contains rules that define a manner in which prompts are generated for the language;

wherein the rules define which prompt file should be retrieved to generate the prompt for the user when at least one parameter representing user data input satisfies a particular rule;

selecting, by applying the rules to the request received from the user, between text prompt files that apply to the email server and audio prompt files that apply to the voice mail server.

51. The apparatus of claim 50 wherein the localization document comprises an Extensible Markup Language (XML) document.

52. The apparatus of claim 50, wherein the prompt server is further configured to initialize the language with functions that comprise:

parsing the localization document to generate a document object model (DOM) tree; and analyzing the DOM tree to determine files that are appropriate for the prompt, the files to be retrieved from the email server or the voice mail server to be provided to the caller user in response to input from the caller user.

53. A method of generating an audio prompt, the method comprising:

at a unified messaging server, determining a language to use when generating an audio prompt;

initializing an language in which the audio prompt is to be generated, wherein the unified messaging server generates text prompts and audio prompts, wherein the unified messaging server is in communication with at least an email server and a voice mail server;

wherein the initializing the language comprises:

obtaining a localization document, appropriate for the user, associated with the language, wherein the localization document contains rules that define a manner in which prompts are generated for the language;

wherein the rules define which prompt file should be retrieved, from the email server or the voice mail server to be provided to a user in response to input sent from the user to the unified messaging server, to generate the prompt when at least one parameter representing user data input satisfies a particular rule;

selecting, by applying the rules to the request received from the user, between text prompt files that apply to the email server and audio prompt files that apply to the voice mail server;

based on the determined files, identifying prompt parameter settings associated with the audio prompt to be generated;

providing information regarding the audio prompt to be generated, the language to use when generating the audio prompt, and the audio prompt parameter settings to a prompt module; and receiving a sequence of audio files from the prompt module, wherein the sequence of audio files represent the audio prompt.

54. The method as recited in claim 53 wherein the localization document comprises an Extensible Markup Language (XML) document.

55. The method of claim 53, further comprising the steps of:

parsing the localization document to generate a document object model (DOM) tree; and analyzing the DOM tree to determine files that are appropriate for the prompt.

* * * * *